United States Patent
Vahora et al.

(10) Patent No.: US 12,151,434 B2
(45) Date of Patent: Nov. 26, 2024

(54) NON-SOLID CORE FILAMENT FOR 3-D PRINTING

(71) Applicant: Arkema Inc., King of Prussia, PA (US)

(72) Inventors: Azaz Vahora, Eagleville, PA (US); James Joseph Henry, Downingtown, PA (US); David Shin-Ren Liu, Bala Cynwyd, PA (US)

(73) Assignee: Arkema Inc., King of Prussia, PA (US)

( * ) Notice: Subject to any disclaimer, the term of this patent is extended or adjusted under 35 U.S.C. 154(b) by 560 days.

(21) Appl. No.: 16/771,763

(22) PCT Filed: Dec. 27, 2018

(86) PCT No.: PCT/US2018/067587
§ 371 (c)(1),
(2) Date: Jun. 11, 2020

(87) PCT Pub. No.: WO2019/133651
PCT Pub. Date: Jul. 4, 2019

(65) Prior Publication Data
US 2021/0069981 A1    Mar. 11, 2021

Related U.S. Application Data

(60) Provisional application No. 62/611,745, filed on Dec. 29, 2017.

(51) Int. Cl.
*B33Y 70/00*    (2020.01)
*B29C 64/118*    (2017.01)
(Continued)

(52) U.S. Cl.
CPC .......... *B29C 64/314* (2017.08); *B29C 64/118* (2017.08); *B33Y 10/00* (2014.12);
(Continued)

(58) Field of Classification Search
CPC ......... B33Y 70/00; B33Y 70/10; B33Y 10/00; B29C 64/118; B29C 64/314; D01D 5/247; D01D 5/34; D01F 1/08
USPC ........................................ 428/212, 218, 220
See application file for complete search history.

(56) References Cited

U.S. PATENT DOCUMENTS 6,007,911 A * 12/1999 Bowen, Jr. ............. D03D 15/30
442/201
8,221,669 B2    7/2012 Batchelder et al.
(Continued)

FOREIGN PATENT DOCUMENTS

CN    107254151    * 10/2017
CN    107254151 A    10/2017
(Continued)

*Primary Examiner* — Ruiyun Zhang
(74) *Attorney, Agent, or Firm* — Joanne Rossi

(57) ABSTRACT

The invention relates to thermoplastic filament for use in 3-D printers, in which the core of the filament is non-solid or mono-filament. The filament may contain a multitude of small micro-voids, (a micro foam), be a foam-core structure, be hollow, or have a monofilament core. The filament of the invention is especially useful with crystalline and semi-crystalline polymers, and reduces the negative effect of filament voids, formed by shrinkage during the cooling of the filament.

15 Claims, 9 Drawing Sheets

(51) Int. Cl.
*B29C 64/314* (2017.01)
*B33Y 10/00* (2015.01)
*B33Y 40/10* (2020.01)
*B33Y 70/10* (2020.01)
*D01D 5/247* (2006.01)
*D01D 5/34* (2006.01)
*D01F 1/08* (2006.01)
*B29C 64/321* (2017.01)
*B29K 101/12* (2006.01)

(52) U.S. Cl.
CPC .............. *B33Y 40/10* (2020.01); *B33Y 70/00* (2014.12); *B33Y 70/10* (2020.01); *D01D 5/247* (2013.01); *D01D 5/34* (2013.01); *D01F 1/08* (2013.01); *B29C 64/321* (2017.08); *B29K 2101/12* (2013.01)

(56) References Cited

U.S. PATENT DOCUMENTS

| | | |
|---|---|---|
| 8,801,990 B2 | 8/2014 | Mikulak et al. |
| 9,592,530 B2 | 3/2017 | Rodgers |
| 10,259,936 B2 | 4/2019 | Liu et al. |
| 2012/0045603 A1 | 3/2012 | Zerafati et al. |
| 2013/0108816 A1 | 5/2013 | Zerafati et al. |
| 2020/0298467 A1 | 9/2020 | Cakmak et al. |

FOREIGN PATENT DOCUMENTS

| | | | |
|---|---|---|---|
| JP | 2005206631 A | 8/2005 | |
| JP | 2017213813 A | 12/2017 | |
| WO | WO-2017173258 A1 * | 10/2017 | ........... B29C 64/112 |

* cited by examiner

NON-SOLID CORE FILAMENT FOR 3-D PRINTING

"This application is the national phase under 35 USC § 371 of PCT International Application Number PCT/US2018/067587 filed Dec. 27, 2018 and which claimed priority to U.S. Provisional Application Ser. No. 62/611,745 filed Dec. 29, 2017." Each of these applications is incorporated by reference herein in its entirety.

FIELD OF THE INVENTION

The invention relates to thermoplastic filament for use in 3-D printers, in which the core of the filament is non-solid or mono-filament. The filament may contain a multitude of small micro-voids, (a micro foam), be a foam-core structure, be hollow, or have a monofilament core. The filament of the invention is especially useful with crystalline and semi-crystalline polymers, and reduces the negative effect of inconsistent filament voids, formed by shrinkage during the cooling of the filament.

BACKGROUND OF THE INVENTION

Equipment advances and reduction in pricing have allowed 3D printing to become widely adopted in homes, schools, and industry as a fast, simpler, and often cheaper way to prototype and make custom end-use parts. Specifically, material extrusion 3D printing (also known as fused filament fabrication or fused deposition modeling), has emerged as a tool of choice for direct consumer use, larger scale production, and quick thermoplastic prototyping as it is the easiest to operate, produces the least waste, and provides the shortest turnaround time of conventional 3D printing technologies.

Many materials have been used to produce 3-D printed articles for a wide variety of end uses, from chocolate to collagen. Thermoplastic materials are especially well adapted for use with 3-D printers. Unfortunately, there have been few thermoplastics available that provide high chemical resistance, flame resistance, and good mechanical properties.

Some amorphous polymers like polyphenylsulfone (PPS) have only a 3 percent elongation when printed. Nylons have higher elongation (~30%) but poor chemical resistance and must be dried prior to printing. Much higher elongation, flexible thermoplastic polyurethanes are available but have poor chemical resistance and weathering resistance.

Crystalline and semi-crystalline polymers, such as fluoropolymers, polyamides, polyether ketone, and polyether ether ketone have good mechanical properties, and generally good weathering, however they tend to have high shrinkage on transition from the melt to a final solid, which creates voids in filaments and printed articles.

US 2015/635,525 to Arkema Inc. describes the successful 3D printing of semi-crystalline PVDF, by selection and adjustment of three different parameters in the 3-D process. The parameters include: polymer or polymer blend selection, optional filler selection, and specific processing conditions.

PVDF foams and foam core materials, have been described in US 2012-0045603 and US 2013-0108816. PVDF 3D filament has been successfully used in 3D printing, by manipulation of the PVDF composition, addition of specific fillers, and selection of processing conditions, as described in US 62/55,576.

3D printable co-extruded filament with two different materials, an outer shell having a different crystallization temperature than the inner core, has been described in U.S. Pat. No. 8,801,990. The difference in crystallization temperature allows the material of the shell to crystallize upon deposition while the material of the core crystallizes upon further cooling. The desirably reduces distortions and internal stresses when used in 3D printing.

Filaments composed of a polyamide blend having a hollow geometry have been described in U.S. Pat. No. 9,592,530. According to U.S. Pat. No. 8,221,669 a hollow filament may improve the liquefier response time and/or feed rates for 3D printing.

Problem: A problem with polymer filament for 3D printing, especially with crystalline or semi-crystalline polymer filament, is the presence of internal voids due to shrinkage of the polymer and often referred to as "shrink voids" during filament cooling and crystallization of the polymer. These shrink voids can be seen as relatively large bubbles that are often described as white defects, tend to be present more in the center of the filament, and are randomly dispersed along the filament length. The size and randomness of the shrink voids leads to irregular output of the material during printing, voids in the output, and at times gaps in the extrusion line, all defects in the final printed product, adversely affecting print quality. The defects in printed products are especially a concern when printing large parts and become more noticeable when printing with a larger nozzle size. In addition, the presence of large voids in the final printed part are locations of potential part failure.

Solutions: One solution to the shrink void problem would be a process for extruding shrink-void-free filaments of crystalline or semi-crystalline polymers. In theory this could be accomplished by slowing the cooling rate after extrusion—or by finding a way to cool the filament core faster than the filament surface. Currently, some amorphous and crystalline filaments for 3D printing are made with controlled cooling rate by means of hot water, air, or oil, such that there are no voids or minor voids in the filament. Even so, in some cases where the material has higher crystallinity, there are some shrink voids in the filament, and in other cases, especially when the filament is air cooled, there are significant outside diameter (OD) fluctuations in place of or in addition to shrink voids. OD fluctuation along the filament length results in uneven material flow during 3D printing resulting in over and under filled defects in the printed part. Most 3D printers extrude at a constant speed and not at a constant flow rate. OD fluctuations result in fluctuations in flow rate which results in defects.

An alternative, and more practical solution to the void-shrinkage problem presented by the present invention is to provide a filament with monofilament core or a non-solid having a uniform structure. The non solid filament could be in the form of a microfoamed filament or a hollow core. These micro cored filament core, or micro foamed filament eliminates large shrink voids and reduces OD fluctuations. The filament of the invention could have a hollow core, be entirely a foam, have a foam-core structure with a foam core surrounded by solid material, or have a solid, void free monofilament core. The foam should have very small voids—smaller than normal large shrink voids. In addition, the smaller bubbles although centrally located, can be dispersed within the cross section of the filament and do not occur only in the filament center. The presence of smaller voids that are distributed more randomly through the cross section is what differentiates it from normal shrink voids that are large and located in the center of the filament cross section. These approaches result in a printed part without void defects associated with a solid filament having large shrink voids. In addition, the filament of the invention may have a density lower than a solid core filament without shrink void of the same outside diameter. Normally the filament of the invention would have a density higher than or similar to the same filament containing shrink voids.

SUMMARY OF THE INVENTION

The invention relates to filaments designed to reduce shrink void defects in a 3D printed article, printed from a semicrystalline or crystalline polymer. The novel filaments could be foamed, have a foamed core, have a hollow core, or have a monofilament core.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

Aspect 1: A filament for 3D printing comprising a semicrystalline or crystalline polymer, wherein the filament comprises a:
  a. microfoam, wherein said microfoam comprises the semicrystalline or crystalline polymer and microvoids; or
  b. a center monofilament surrounded by the remaining portion of the filament to form a solid filament, wherein said central monofilament has the same composition as the surrounding portion of the filament; or
  c. a hollow core wherein the semicrystalline or crystalline polymer surrounding the hollow core is selected from the group consisting of: fluoropolymers, block polyether-amide polypropylene, polyethylene, semicrystalline polyether ketoneketone (PEKK), semicrystalline polyether etherketone (PEEK), polyester, and acetal.

Aspect 2: The filament of aspect 1, wherein the filament comprises a microfoam, wherein said microfoam comprises the semicrystalline or crystalline polymer and microvoids.

Aspect 3: The filament of aspect 1, wherein said filament comprises a microfoam core located in the center of the filament.

Aspect 4: The filament of any one of aspects 1 to 3, wherein said filament contains a center core microfoam that is less than % the outer diameter of the filament.

Aspect 5: The filament of any one of aspects 1 to 4, wherein said microfoam has a density reduction less than 10 percent and more preferably less than 5 percent as compared to the unfoamed filament.

Aspect 6: The filament of any one of aspects 1 to 5, wherein said the microvoids have an average diameter of less than 0.5 mm, preferably less than 0.3 mm, more preferably from 0.02 mm to 0.2 mm.

Aspect 7: The filament of aspect 1, comprising a center monofilament surrounded by the remaining portion of the filament to form a solid filament, wherein said central monofilament has the same composition as the surrounding portion of the filament.

Aspect 8: The filament of aspect 6, wherein the center monofilament comprises no more than 25% the outer diameter of the final filament.

Aspect 9: The filament of any one of aspects 2 to 8, wherein the polymer is selected from the group consisting of: fluoropolymers, polyamides, polyamide 11, polyamide 12, copolyamides, block polyether-amide polypropylene, polyethylene, semicrystalline polyether ketoneketone (PEKK), semicrystalline polyether etherketone (PEEK), polyester, and acetal.

Aspect 10: The filament of aspect 1, wherein the filament comprises a hollow core, wherein said hollow core is located in the center of the filament.

Aspect 11: The filament of aspects 8 or 9, wherein the hollow core is no more than 25% the outer diameter of the filament.

Aspect 12: The filament of aspect 1, wherein the filament comprises a hollow core, wherein said hollow core is in a shape selected form the group consisting of a circle, oval, square and star.

Aspect 13: The filament of any one of aspects 1 to 10, wherein said polymer comprises a fluoropolymer is a melt processable fluoropolymer selected from the group consisting of polyvinylidene fluoride (PVDF) homopolymer, PVDF copolymer, ethylene tetrafluoroethylene (ETFE), Fluorinated ethylene propylene (FEP), tetrafluoroethylene/ hexafluoropropylene/vinylidene fluoride copolymer (THV), PFA, ethylene chlorotrifluoroethylene (ECTFE).

Aspect 14: The filament of any one of aspects 1 to 13, wherein said filament further comprises fillers.

Aspect 15: The filament of any one of aspects 1 to 14, wherein said fillers are selected from the group consisting of carbon fiber, carbon powder, milled carbon fiber, carbon nanotubes, glass beads, glass fibers, nano-silica, ARAMID fiber, PVDF fiber, polyarylether ketone fibers, $BaSO_4$, talc, $CaCO_3$, graphene, nano-fibers having an average fiber length of from 100 to 150 nanometers, and hollow glass or ceramic spheres.

Aspect 16: A 3D article printed from the filament of any one of aspects 1 to 15.

Aspect 17: A method for reducing shrink voids in a 3D printed article printed from a semicrystalline or crystalline polymer comprising the steps of:
  a) forming either:
    1) a foamed filament containing microvoids, each microvoid having an average diameter of less than 0.5 mm, preferably less than 0.3 mm, more preferably from 0.02 mm to 0.2 mm; or
    2) forming a filament having a central core that is either a microfoam, hollow, or a monofilament;
  b) feeding said filament to a 3D printer under conditions for printing an article from said filament.

Aspect 18. The method of aspect 17, wherein the filament of b) is a filament according to any one of aspects 1 to 15.

DETAILED DESCRIPTION

Figure 1:
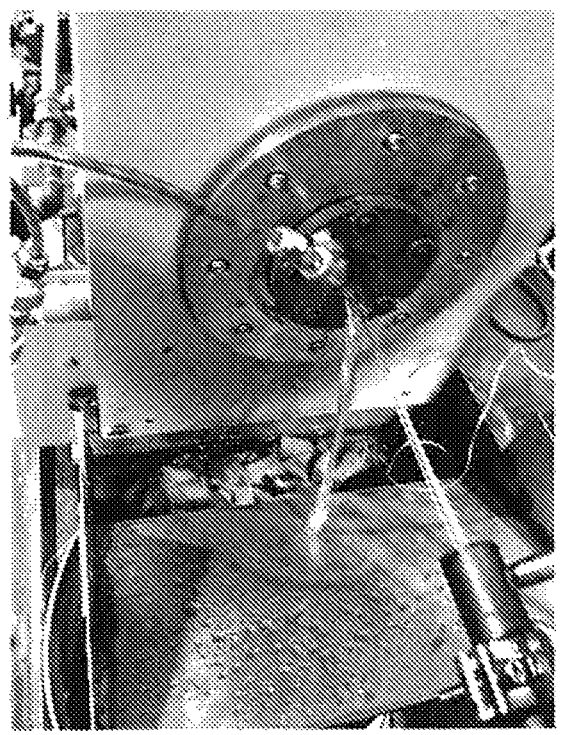
FIG. 1 shows the production of filament for 3D printing.

"Copolymer" as used herein means polymers having two or more different monomer units. "Polymer" is used to mean both homopolymer and copolymers. For example, as used herein, "PVDF" and "polyvinylidene fluoride" are used to connote both the homopolymer and copolymers of polyvinylidene fluoride, unless specifically noted otherwise. Polymers may be straight chain, branched, star, comb, block, or any other structure. The polymers may be homogeneous, heterogeneous, and may have a gradient distribution of co-monomer units. All references cited are incorporated herein by reference. As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble fraction molecular weight after extraction from gel is used.

Filament Polymers:

The present invention is useful for any type of thermoplastic filaments of any diameter and any composition. While the invention would improve the quality of 3D printed amorphous polymers, it is especially useful with semi-crystalline polymers—as these polymers tend to have greater shrinkage during cooling and crystal formation—creating more and larger voids in the filament. The filaments of the invention can be produced using traditional plastic process equipment.

Filaments for 3D printing currently range from 1.75 to 2.85 mm OD. However, the present invention could apply to any size filament that might be used in 3D printing. Indeed, since shrinkage voids appear to form primarily in the center of the filament during the cooling process, the present invention with a non-solid center, could enable the use of even thicker filaments without large shrinkage voids. While the invention would improve the quality of 3D printed parts from filaments of any diameter, it is especially useful with filaments of larger outside diameter as larger diameter filaments are more prone to the formation of shrink voids.

Semicrystalline polymers are those that exist as viscous liquids at temperatures above the melting point of the crystals. Upon cooling, crystals nucleate and grow to fill the available volume. These materials are called "semicrystalline" since some fraction of the polymer remains un-crystallized, or, amorphous when the polymer is cooled to room temperature. The amorphous polymer becomes trapped between the growing crystals. As a result of the highly entangled nature of the polymer chains, the movement of the amorphous polymer becomes restricted.

Crystallinity can be as measured by differential scanning calorimetry (DSC) heating a 10 mg sample from room temperature to 50° C. above the melting point at 20° C. per min—hold for 5 min and then cool at 10° C. per min to room temperature. Semi crystalline polymers of the invention have a heat of fusion greater than 2 J/g and preferably greater than 5 J/g. The heat of melting is calculated by standard methods of the Joules of heat of fusion divided by the weight of the sample. Another way to distinguish a semicrystalline polymer is that it would have at least 5%, and preferably at least 10% crystallinity, as measured by DSC.

Useful semi-crystalline polymers useful in the invention include, but are not limited to:

A) Polyvinylidene fluoride (PVDF) homopolymer or copolymer. The PVDF copolymer would contain greater than 51 percent by weight, preferably 70 percent of the total weight of all the monomer units in the polymer, and more preferably, comprise greater than 75 percent of the total weight of the monomer units. Copolymers, terpolymers and higher polymers (generally referred to herein as "copolymers") of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene.

Preferred copolymers or terpolymers are formed with vinylidene fluoride and one or more of vinyl fluoride, trifluoroethene, tetrafluoroethene (TFE), hexafluoropropene (HFP), and chlorofluoroethylene.

Preferred copolymers include those comprising from about 60 to about 99 weight percent VDF, and correspondingly from about 1 to about 40 percent HFP; copolymers of VDF and CTFE; terpolymers of VDF/HFP/TFE; and copolymers of VDF and EFEP The PVDF of the invention could also be an alloy of PVDF and a miscible, semi-miscible, or compatible polymer. Since most alloys of PVDF result in some diminishment of the PVDF properties, a preferred PVDF is one that is not an alloy. However, small amounts of other polymers, up to 30 percent of the total PVDF polymer alloy, may be added. Other fluoropolymers, thermoplastic poly urethane (TPU) and (meth)acrylic polymers are examples of useful polymers that may make up a useful polymer alloy.

In one embodiment, the fluoropolymer is a branched fluoropolymer. A branched fluoropolymer could result in smaller void cells, and could be a useful choice in forming a foamed multi-layer filament.

B) Polyamide, such as PA 6, PA 7, PA 8, PA9, PA 10PA 11 and PA12 (such Rilsan® or Rilsamid® polyamides from Arkema Inc.), C) Copolyamides, such as copolymers of caprolactam and lauryllactam (PA 6/12), copolymers of caprolactam, adipic acid and hexamethylenediamine (PA 6/6-6), copolymers of caprolactam, lauryllactam, adipic acid and hexamethylenediamine (PA 6/12/6-6), copolymers of caprolactam, lauryllactam, 11-aminoundecanoic acid, azelaic acid and hexamethylenediamine (PA 6/6-9/11/12), copolymers of caprolactam, lauryllactam, 11-aminoundecanoic acid, adipic acid and hexamethylenediamine (PA 6/6-6/11/12), and copolymers of lauryllactam, azelaic acid and hexamethylenediamine (PA 6-9/12).

D) Block polyamide copolymers such as block polyester-amide and block polyether-amide (such as PEBAX® resin from Arkema Inc.).

E) Polypropylene.

F) Polyethylene.

G) Semicrystalline polyether ketoneketone (PEKK) or polyether etherketone (PEEK).

H) Blends or alloys of semicrystalline polymers with amorphous polymers, such as a compatible blend of PVDF with a homopolymer of copolymer of poly (methyl methacrylate).

I) Polyesters, such as polyethylene terephthalate (PET), polybutylene terephthalate (PBT) and copolyesters.

J) Polyphenylene sulfide.

K) Polyoxymethylene.

L) Other melt-processible fluoropolymers, including ethylene tetrafluoroethylene (ETFE), Fluorinated ethylene propylene (FEP), tetrafluoroethylene/hexafluoropropylene/vinylidene fluoride copolymer (THV), and ethylene chlorotrifluoroethylene (ECTFE).

The polymer may be a blend of a thermoplastic polymer with selected fillers. Fillers can be added to the fluoropolymer at an effective level of from 0.01 to 50 weight percent, preferably 0.1 to 40, more preferably from 1 to 30 weight percent, even more preferably from 1 to 19 weight percent, and even more preferably from about 1 to 15 weight percent, based on the total volume of the fluoropolymer and filler. The fillers can be in the form of powders, platelets, beads, and particles. Smaller materials, with low aspect ratios are preferred, to avoid possible fouling of the nozzle. Useful fillers for the invention include, but are not limited to carbon fiber, carbon powder, milled carbon fiber, carbon nanotubes, glass beads, glass fibers, nano-silica, Aramid fiber, PVDF fiber, polyarylether ketone fibers, $BaSO_4$, talc, $CaCO_3$, zinc oxide, graphene, nano-fibers (generally having an average fiber length of from 100 to 150 nanometers), and hollow glass or ceramic spheres. The addition of fillers are known to have the ability of reducing shrinkage from the melt and therefore can work together with this invention to further reduce large void formation.

One could envision the use of particles with an aspect ratio designed to improve mechanical strength as another alternative to the particulate filler tested so far.

It is expected that the fillers, and especially fibers, can provide excellent shrinkage reduction. One issue with fibers is that they tend to increase the viscosity of the melt, and could clog nozzles. This effect could be minimized by using lower melt viscosity polymers, a short aspect ratio fiber, or a larger nozzle size.

Other common additives may also be added to the fluoropolymer composition in effective amounts, such as, but not limited to adhesion promoters and plasticizers.

Monofilament Core:

In one embodiment, a solid monofilament core is jacketed with the same or different material. The monofilament core can be produce by first producing the monofilament using a traditional inline die, and then co-extruding over the monofilament using a cross head die (with or without vacuum) to form the final filament. The target for the monofilament is between 0.25 to 0.30 mm, though this depends on the final filament diameter for the 3D printer, with a larger or smaller monofilament being part of the invention, between 0.15 and 0.45 mm. The microfilament core could have any profile, including round, oval, star, square, or any other shape.

The goal is to produce a void-free filament. Since shrinkage voids appear predominantly in the filament center, the presence of a solid core prevents formation of voids in this location. The solid core filament is comprised of a filament having a small OD that is coated with another layer to produce a filament having the desired outside diameter. It is understood that the small filament can be produced without void formation. A common example of a void free filament having a small outside diameter and often produced with crystalline polymers is ordinary monofilament fishing line. By producing a small filament first, then in a second step, applying a second layer to produce a filament of the desired OD, one can produce a shrinkage void-free, or nearly void-free. The jacket, preferably of the same material, but can be a different material, is the extruded over the core, to produce a solid void-free filament.

The filament core could be a single layer, or could consist of two or more layers, which could be produced, for example by coextrusion. Each layer of the filament can be constructed with the same or different materials such as a semi-crystalline polymer, amorphous polymer, blend of semi crystalline polymer and amorphous polymer, blend of various crystalline polymers, filled polymer (glass fiber, glass beads, carbon fiber, carbon powder, zinc oxide, conductive filler, plasticizer, cross link promoter), polymer alloy, rubber, or any combination.

In one embodiment, the internal monofilament can be coated. The coating could be and adhesive material that could help with layer to layer adhesion in the final printer part. The coating could also be a crosslink promoter, and following printing, radiation could be applied to promote linkage between the layers—which could enhance the z direction mechanical properties. One could imagine other coatings on the monofilament, which would become part of the final printed article, to add specific chemical or mechanical properties.

The final filament would appear as a solid core filament with no voids.

Hollow Core:

Another approach to solve the problem of void formation in a filament, is a hollow core filament. This construction would have a filament with a hollow, uniform small opening in the center of the filament. Any air contained inside the micro core filament would be allowed to pass back through the filament center opening, or pass through the nozzle without interfering with the printing process. The hollow micro core could have any profile, including round, oval, square, star-shaped, and any other shape or profile.

The presence of the open core would eliminate void formation in the core, and would result in a consistent OD in the filament. The filament could be produced using standard cross head or traditional extrusion technology with an inline die with a hypodermic needle tip. The hypodermic needle will be design such that the smallest ID can be achieved. The filament's center hollow core is no more than 25% the diameter of the filament OD—or in total volume, the hollow core is no more than 6.25% of the filament. The initial target ID for the hollow filament is 0.25 mm. In other words, for a 1.85 mm OD filament, the hollow core of 0.25 mm ID would only occupy 1.8% of the filament in volume, and for a 2.85 mm OD filament, the hollow core would occupy even less volume, only 0.7%. The hollow core filament ID can be anything from 0.01 mm to OD of the filament minus 0.05 mm. This could apply to any size filaments that are made for 3D printing application. Preferably, the hollow core is no more than 20%, preferably no more than 10%, preferably no more than 5%, more preferably no more than 2.5%, even more preferably no more than 2%, even more preferably, less than 1% of total cross sectional area of the filament or calculated volume of the filament targeted to be hollow.

An alternative process to extruding the hollow core, would be by loosely jacketing a carrier filament, then pulling out the carrier filament.

Foam, Foam Core:

A third approach for overcoming the printability defect issue coming from large shrinkage voids, is to produce a filament that converts the large voids into micro-voids that do not impact 3D printing quality. This can be done by generating a uniformly foamed filament consisting of evenly dispersed microvoids. Alternatively, one could create a foamed core layer containing microvoids coated with a solid layer of polymer (a foam-core filament).

The microvoids are preferably as small as possible, having an average diameter of less than 0.5 mm preferably less than 0.30 mm, more preferably in the range of 0.005 mm to 0.2 mm, and more preferably in the range of 0.01 mm to 0.1 mm. While not being bound by any particular theory, it is believed that the smaller the voids, the less of the effect on the final property part.

The terms "foaming agent" and "blowing agents" are used interchangeable.

One approach to forming the microvoids is by using a physical or chemical foaming agent blended with the polymer—with the foam forming during the extrusion process. The foaming agent could be pre-formulated as part of a master batch, which is blended into the polymer matrix prior to filament extrusion.

Blowing agents useful in the invention can be either chemical or physical blowing agents, or a mixture thereof. In the case of a chemical blowing agent, the gas is created by decomposition of a chemical heated above its degradation temperature. In the case of the physical blowing agent, gas is introduced into the polymer either directly or through evaporating a liquid foaming agent by heating it above its evaporation temperature.

The chemical blowing agent can be a solid or fluid. Useful blowing agents include, but are not limited to, azodicarbonamide, azodiisobutyronitrile, sulfonylsemicarbazide, 4,4-oxybenzene, barium azodicarboxylate, 5-Phenyltetrazole, p-toluenesulfonylsemicarbazide, diisopropyl hydrazodicarboxylate, 4,4'-oxybis(benzenesulfonylhydrazide), diphenylsulfone-3,3'-disulfohydrazide, isatoic anhydride, N,N'-dimethyl-N,N'dinitroterephthalamide, citric acid, sodium bicarbonate, monosodium citrate, anhydrous citric acid, trihydrazinotriazine, N,N'-dinitroso-pentamethylenetetramine, and p-toluenesulfonyhydrazide, or include a blend two or more of said blowing agents. Mixtures of chemical and physical blowing agents are also contemplated by the invention.

Another approach to producing a polymer foam of the invention is by using a low level of expandable microspheres. The expandable microspheres are small hollow particles with a polymer shell that can encapsulate various liquids or gases. Upon heating, the polymer shell will soften and the liquid inside the sphere changes state to create a large volume of gas with high pressure—which will expand the microsphere substantially.

The spheres can have various diameters, and the very small particle size, at low levels could be useful in the invention, such as 10 to 30 micron microspheres. The expandable microspheres can be added to the extruder with the polymer matrix material, or can be pre-formed into a master batch, then added to the extruder with the polymer matrix material.

The foam of the filament can be of any density—though higher foam density is preferred. The goal is to have the highest density possible while eliminating the large voids. Ideally the foamed filament has the same density or higher than the unfoamed filament containing voids—essentially redistributing any large void to many, more even distributed microvoids. A 10% density reduction foam (as compared to the unfoamed filament containing voids) could be useful, with a density reduction of less than 5%, and even less than 2% more preferred.

While the entire filament could be a foam having microvoids, in one embodiment of the invention the filament has a foam-core structure, having a central foam core surrounded by a solid polymer. The composition of the foam matrix and the solid polymer walls could be the same or different. Any small bubbles in the final 3D printed part should be controllable, not hindering the 3D part printing process and only minimally affecting the final part properties. It is believed that final product properties and part printability are not compromised by the very small bubbles due to foaming with the final product properties proportional to density of the final product. It was found that 3D printing using a filament produced with a micro foam core can eliminate defects associated with shrinkage voids. Producing a foam core filament in this manner would not necessitate the need for a cross head, and standard filament tooling (often inline dies) could be used.

When a foamed filament is 3D printed the density of the printed article can be higher than the foamed filament used to make the article. The final 3D printed article may have a density within 7%, preferably within 5%, preferably within 4% of the density of a similar article that has been injection molded. The 3D printed article can have an increase of density over the foamed filament used to print the article of at least 1%, preferable at least 2 percent, more preferably at least 3%.

EXAMPLES

Examples 1-3

The Kynar® 826-3D resin was converted into 2.85 (±0.05) mm filament using a traditional single filament extrusion line consisting of a 1.5" Davis Standard single screw extruder with a low work barrier screw and a cooling tank containing 80° F. water as shown in FIG. 1. Examples 2-3 Foaming agent, Kynar 2620@ FC, was added to the Kynar® 826-3D resin at various levels by pellet blending and then extruded into 2.85 (±0.05) mm filament as described in Table 1.

TABLE 1

Processing Condition for the Extruding 2.85 mm Filament with/without Foaming Agent

| Ex. No. | Foaming Agent (%) | Temperature (° F.) | | | | | | Screw RPM | Torque (%) | Melt Pressure (Psi) | Melt Temp (° F.) | Puller speed (ft/min) |
|---|---|---|---|---|---|---|---|---|---|---|---|---|
| | | Z1 | Z2 | Z3 | Z4 | Clamp | Die | | | | | |
| 2 | 0 | 350 | 350 | 350 | 350 | 360 | 360 | 22.1 | 47 | 1650 | 343 | 45.3 |
| 3 | 2 | 350 | 400 | 435 | 435 | 360 | 360 | 22.1 | 25 | 1270 | 385 | 55 |
| 4 | 3 | 350 | 400 | 435 | 435 | 360 | 360 | 22.2 | 26 | 1310 | 385 | 58 |

Figure 2:
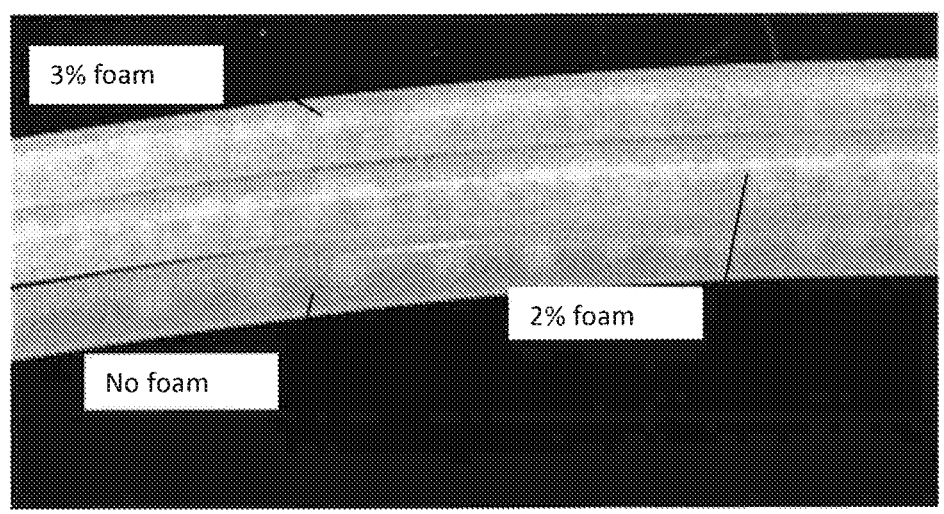
FIG. 2 shows filaments with KYNAR PVDF resin having 0%, 2% and 3% foam agent.

Results:

The filament produced without foaming agent contained large centrally located voids. With the introduction of foaming agent, the void size became smaller and more uniformly distributed within the center of the filament. An example of the filaments produced with different void content can be found in FIG. 2.

Filaments produced with 2% and 3% foam concentrate overall had good overall appearance with minimal ovality variations or diameter fluctuations. Density measurements were taken to determine the density reduction associated with introduction of foaming agent. Ideally, the density reduction would be relatively low compared to the same resin without foaming agent. Density reduction as a function of foaming agent loading can be found in Table 2.

TABLE 2

Densities of the Material

| Example No. | Material | Density (gm/cc) | Filament Effective Desity (compared to Filament with voids) |
|---|---|---|---|
| 1 | Kynar ® 826-3D (Filament with voids) | 1.619 | 100% |
| 2 | Kynar ® 826-3D + 2% Kynar ®2620 FC (Filament Foamed) | 1.587 | 98% |
| 3 | Kynar ® 826-3D + 3% Kynar ® 2620 FC (Filament Foamed) | 1.576 | 97% |
| 4 | Kynar ® 826-3D Hollow Core Filament | 1.60 | 99% |
| 3P | Printed impact bar using Example 3 filament | 1.65 | n/a |
| Comparative C | Kynar ® 826-3D (Injection molded) | 1.69 | n/a |

Figure 3:
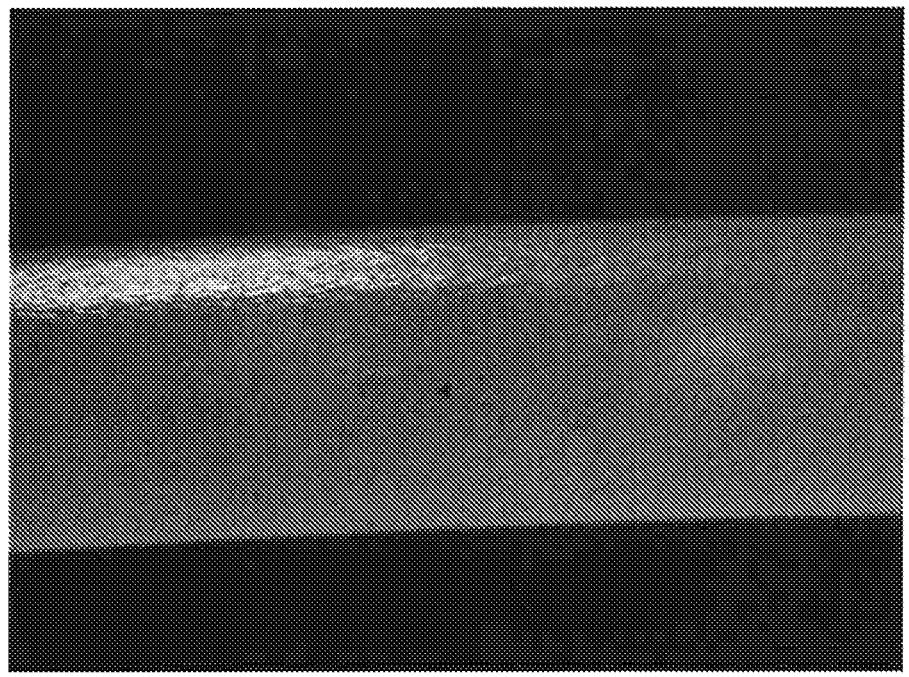
FIG. 3 shows filament without foam agent.

The filament produced without foaming agent (example 1) contained large shrink voids there were centrally located in the filament. The size of the voids was, at times, as much as 30% the diameter of the filament. Filaments containing large voids are known to have difficulties in the printing process. A magnified image of the filament produced with the PVDF compound and containing shrinkage voids can be found in FIG. 3.

Figure 4:
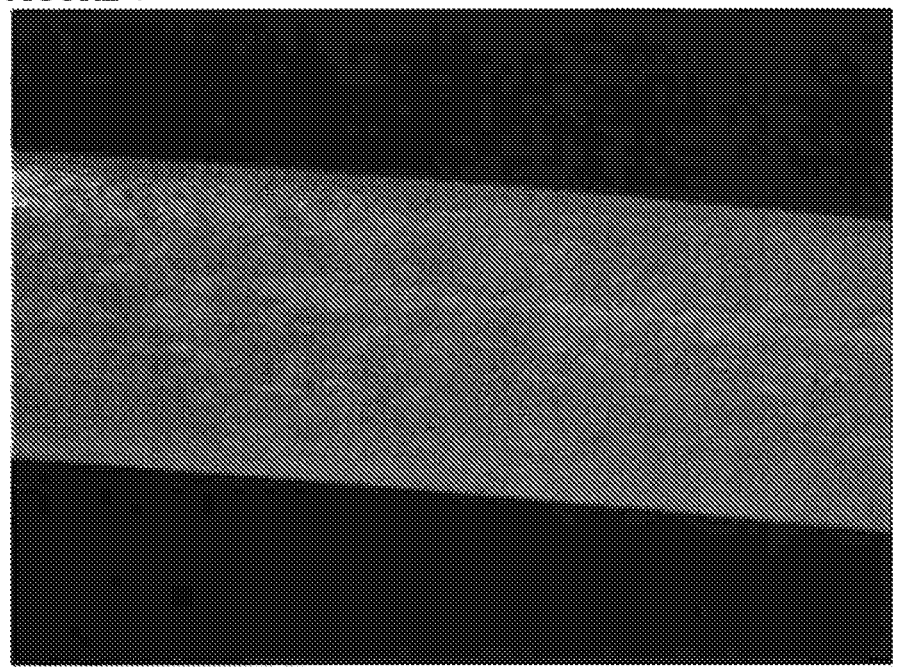
FIG. 4 shows filament with KYNAR PVDF resin having 2% foam agent.

With the addition of 2% foaming agent (example 2), the filament is observed containing a multitude of small bubbles throughout the filament. Ideally, the amount of small bubbles would be slightly less than observed in this image. Of importance, the large voids are no longer present and it was found that this filament processed better than the filament produced without the foaming agent and containing large voids—filaments were more uniform and the extrusion process had less line breaks. A magnified image of the filament produced with the PVDF compound with 2% foaming agent can be found in FIG. 4.

Figure 5:
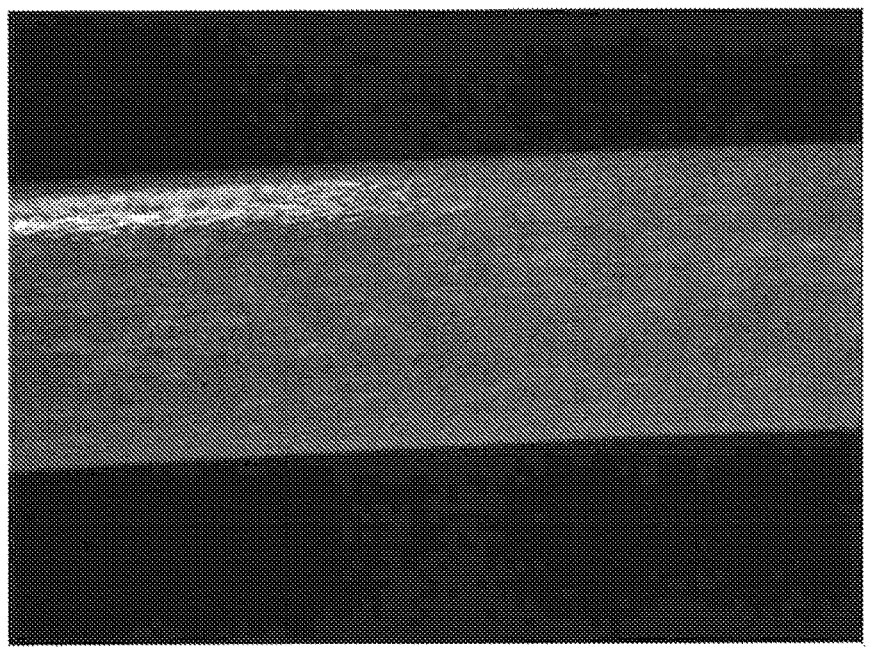
FIG. 5 shows filament with KYNAR PVDF resin having 3% foam agent.

With the addition of 3% foaming agent (example 3), the filament is observed to be similar to the filament produced with 2% foaming agent. The bubbles are relatively small and uniformly distributed within the filament. The large centrally located voids have been removed and no longer present. A magnified image of the filament produced with the PVDF compound with 3% foaming agent can be found in FIG. 5.

Figure 6:
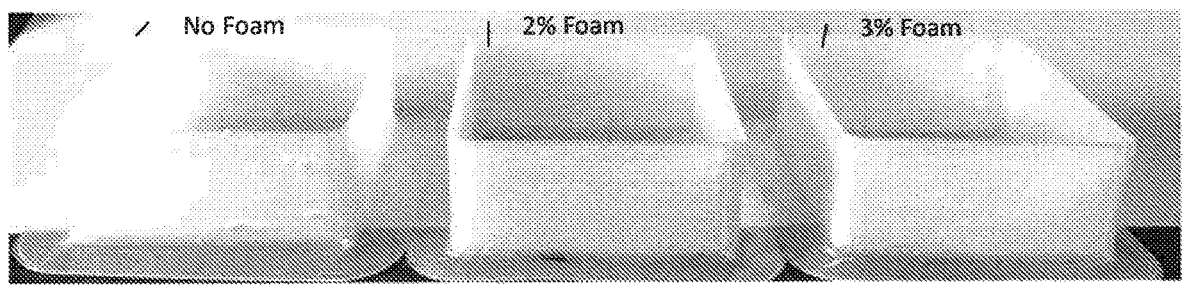
FIG. 6 shows articles printed with the filaments of FIGS. 3-5, containing 0%, 2%, and 3% foaming agent respectively.

The filaments were used to print single wall containers using a 3DP machine with 0.6 mm nozzle as shown in the FIG. 6. The single wall container from filament produced without foam concentrate exhibited large structural defects. Single wall containers produced using filaments produced using the foaming agent, conversely, were found to produce single wall containers without large structural defects.

Figure 7:
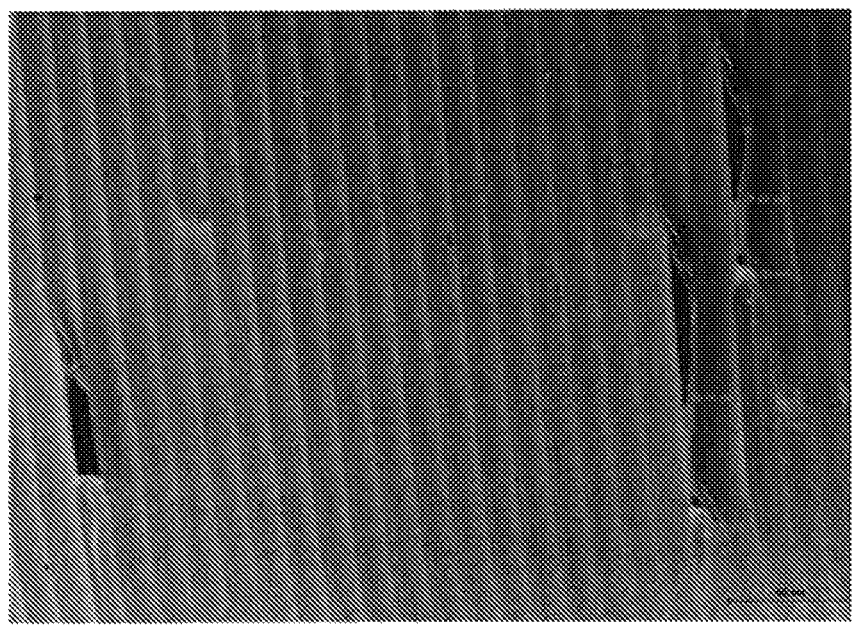
FIG. 7 (comparative), shows an article printed with filament containing shrink voids.

Single wall containers produced with filament not using a foam concentrate had significant structural issues. A magnified region of the container showing these large scale defects can be found in FIG. 7. The defects appear as dislocations and are formed as a large air pocket when extruded through the printer nozzle. These large scale defects will compromise the physical and mechanical performance of the container and are considered unacceptable.

Figure 8A:
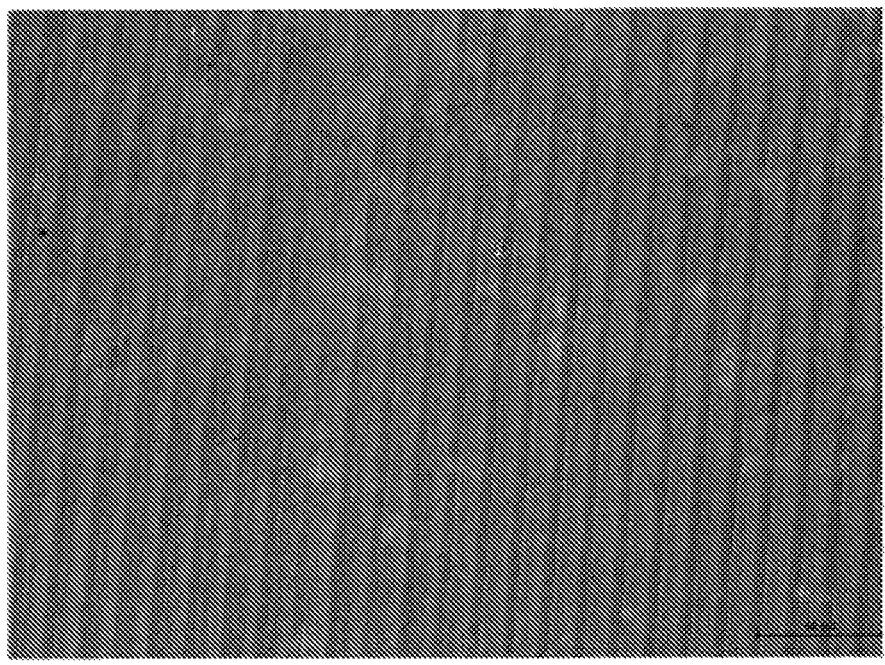
FIG. 8a show an article printed with foamed filament (3% foam agent) of the invention.
Figure 8B:
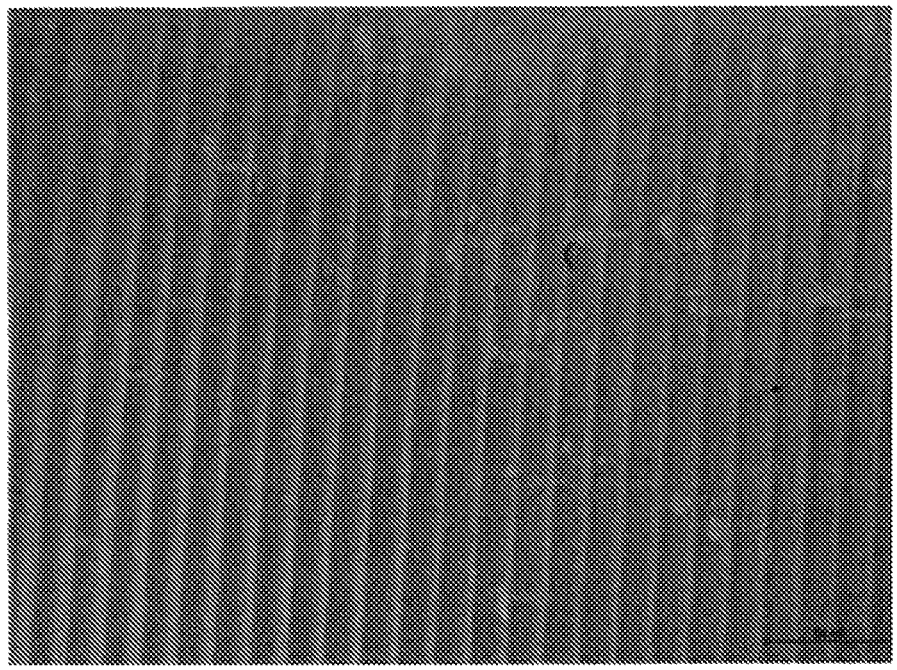
FIG. 8b show an article printed with foamed filament (2% foam agent) of the invention.

Magnified images of the single wall container produced using filaments with foaming agent can be found in FIGS. 8A (3% foam agent) and 8B (2% foam agent). Single wall containers were produced from these filaments were free of large scale defects. Instead, the presences of smaller voids distributed within the wall of the part could be observed. The small size of voids in the filament did not affect printing and the small voids contained in the part wall are not expected to compromise performance. In addition, only a small portion of the small voids in the filament is actually transferred to the 3D printed part. This is shown in that the density of the 3D printed part with the foaming agent (example 3P) is significantly higher than the density of the filament with foaming agent itself (example 3). The density of the printed part (example 3P) is approximately 97% of the density of an injection molded part (comparative C) which is void free.

Figure 9:
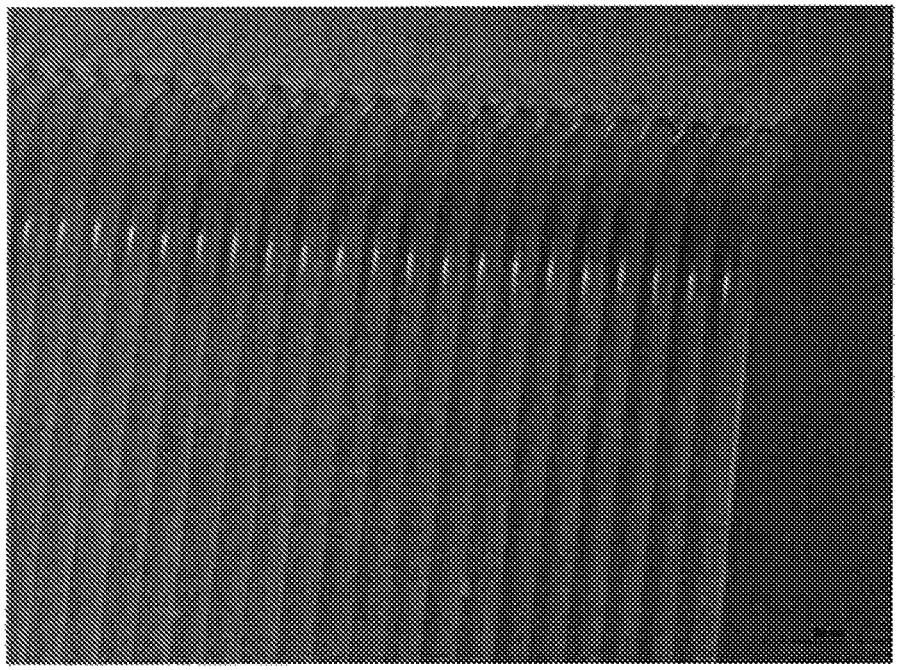
FIG. 9 shows an article printed with foamed filament of the invention using 2% foaming agent.
Figure 10:
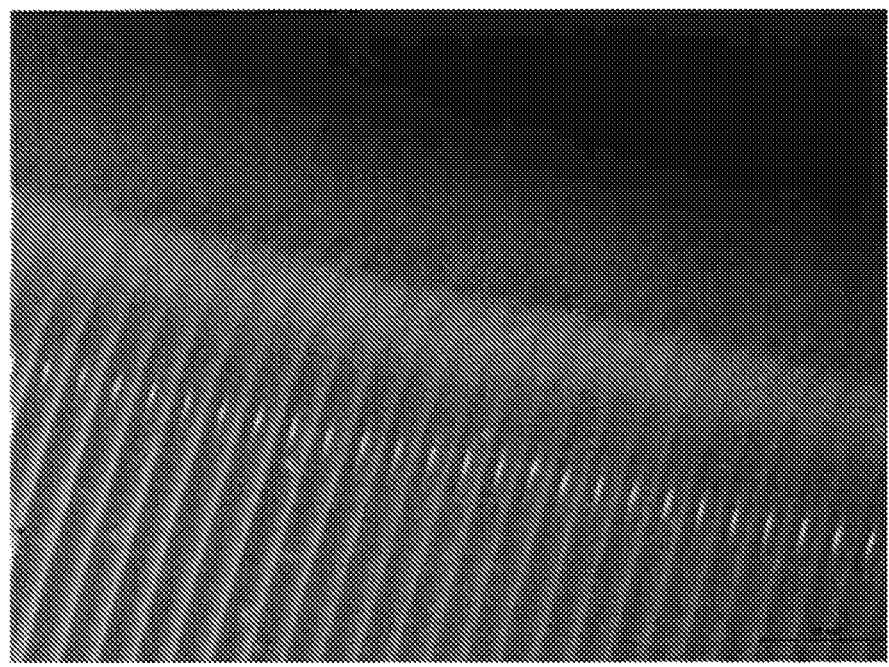
FIG. 10 shows an article printed with foamed filament of the invention using 3% foaming agent

In summary, the foaming resulted in controlled smaller voids which does not affect the 3D printing process and help with printing defect free part. However, small amount of the micro-voids 3 mil (76 microns) to 6 mil (152 microns) in size) manage to migrate into the final printed part which should not affect the final performance of the product. Furthermore, the density reduced by only 2 to 2.5% after foam means the majority of the foaming replaces the voids which could have occurred if not foamed. Additional images showing acceptable printing using a Kynar® 826-3D compound containing foaming agent can be found in FIGS. 9 and 10.

Examples 5 (Comparative Example) and 6 (Example of the Invention)

Figure 11:
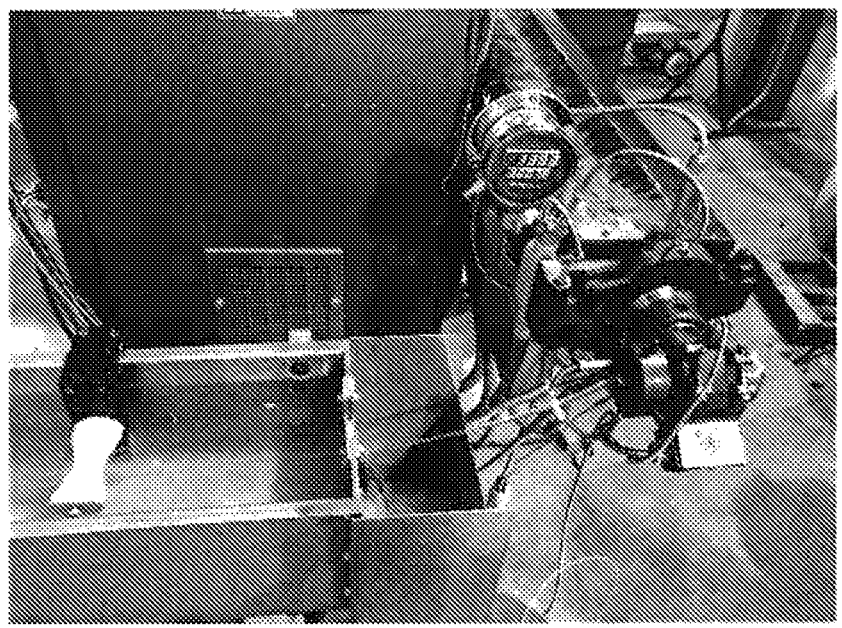
FIG. 11 shows Cross Head Extruder Set-up

For the comparative example, the Kynar® 826-3D resin was converted into 2.85 (0.05) mm filament using a traditional single filament extrusion line consisting of a 1.5" Davis Standard single screw extruder with a low work barrier screw and a cooling tank containing 80° F. water. Whereas, for the example of the invention, a Micro core filament of Kynar® 826-3D resin was made using 1" American Kuhne extruder with low work barrier screw and cross head die (FIG. 11) with hypodermic tip, and cooling tank containing 80° F. water. The filaments were extruded to outer diameter of 2.85 (±0.05) mm and ID of the 0.5 ((±0.05) mm. This results in the hollow core being approximately 3% of the volume of the filament. Table 3 discuss the process condition.

TABLE 3

Processing Condition for the Extruding 2.85 mm Filament

| Filament Type | Temperature (° F.) | | | | | | Screw RPM | Torque (%) | Melt Pressure (Psi) | Melt Temperature (° F.) | Puller speed (ft/min) |
| --- | --- | --- | --- | --- | --- | --- | --- | --- | --- | --- | --- |
| | Z1 | Z2 | Z3 | Z4 | Clamp | Die | | | | | |
| Solid with Shrink Void Example 5 | 350 | 350 | 350 | 350 | 360 | 360 | 22.1 | 47 | 1650 | 343 | 45.3 |
| Micro Core Example 6 | 350 | 350 | 350 | 360 | 360 | 360 | 30 | 50 | 1770 | 385 | 55 |

Results:

The conventionally produced filament described as the solid filament with irregular voids was found to contain significant and large voids within center of filament compared to the hollow micro core filament which contained a continuous hollow center within the filament.

Figure 12:
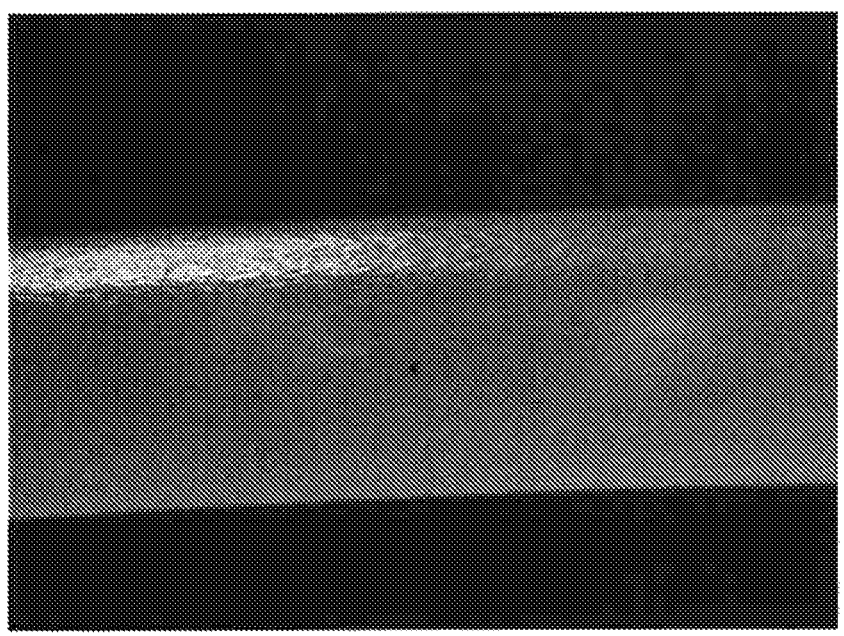
FIG. 12 shows a Filament with Shrink Voids

The filament produced containing large centrally located shrink voids in the filament contained voids that at times was as much as 30% the diameter of the filament. The size of the voids was at times as much as 30% the diameter of the filament. Filaments containing large voids are known to have difficulties in the printing process. A magnified image of the filament produced with the PVDF compound and containing shrinkage voids can be found in FIG. 12.

The Micro Core or hollow core filament is like a tube with very heavy wall. The very small hole in the center is uniform and located at the center of the filament. The uniform hole centered within the filament helps eliminate the formation of shrink voids. The hollow center helps air to escape backwards through the filament which reduces if not eliminates air from flowing through the nozzle and into the part being 3D printed.

Figure 13:
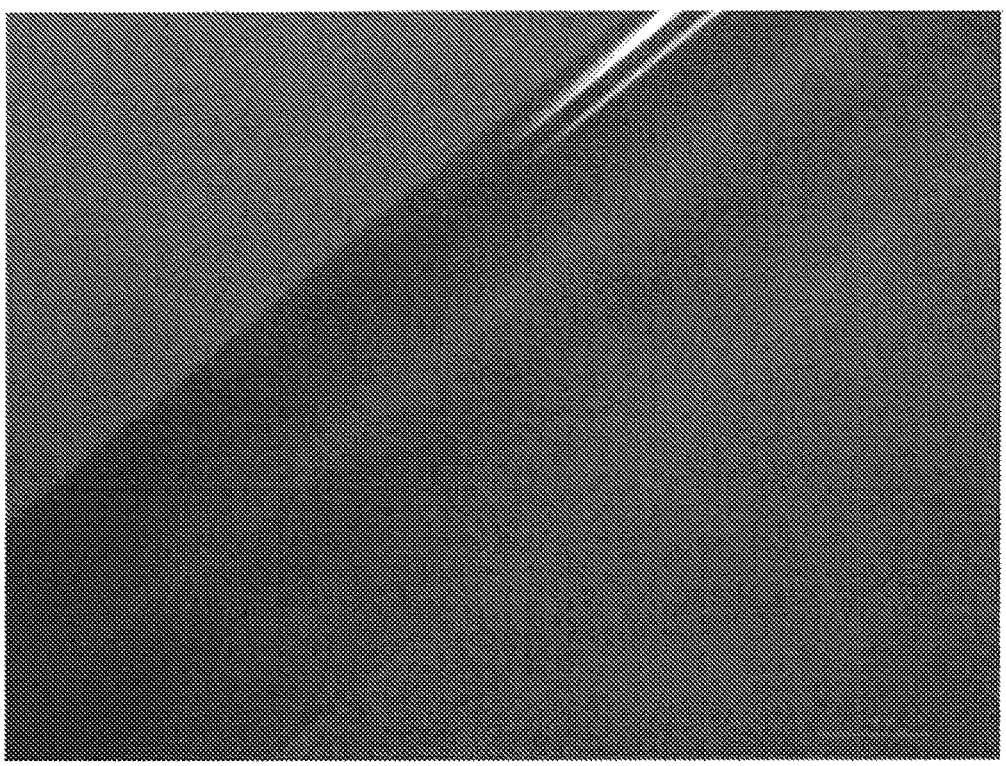
FIG. 13 shows a Micro Core Filament

The uniform cross section area of the filament containing the hollow core improves the consistence of the feed rate through the nozzle. In addition, due to the open center in the hollow core filament, the trapped air could escape back through the filament rather than causing large defect in the printed part. A magnified image of the filament produced with the PVDF can be found in FIG. 13.

Figure 14:
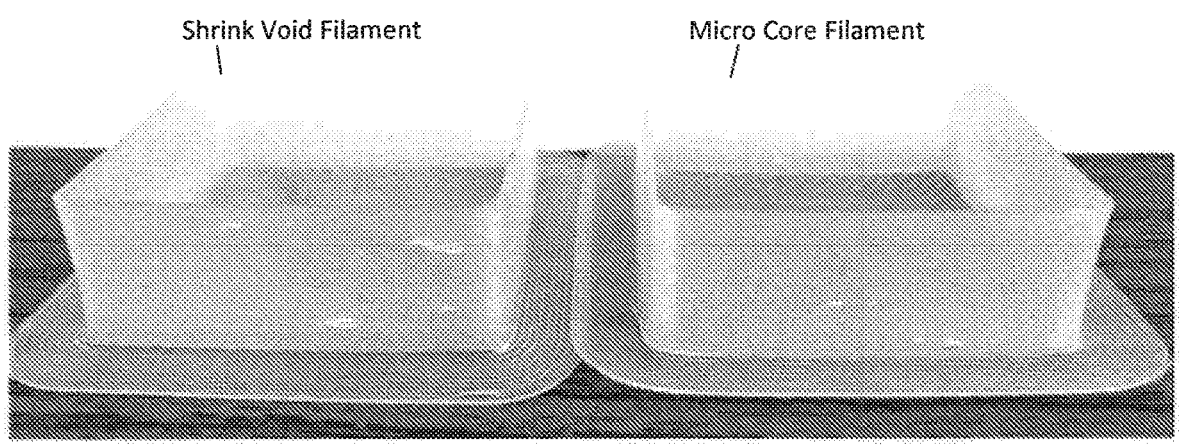
FIG. 14 shows a 3D Printed Single Wall Container

The filaments were used to print single wall containers using a 3DP machine with 0.6 mm nozzle as shown in the FIG. 14. The single wall container, FIG. 14, produced using the micro core filament exhibits no large defects compared to solid filament with irregular voids.

Figure 15:
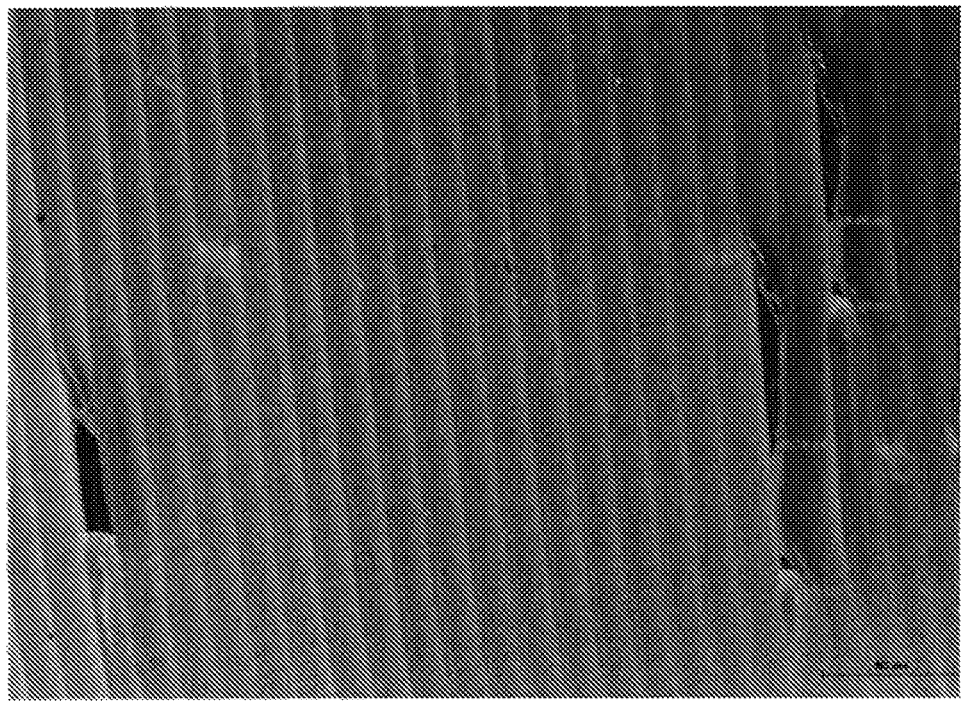
FIG. 15 shows a Container Printed with Shrink Void Filament

Single wall containers produced with shrink void filament had significant structural issues. A magnified region of the container showing these large scale defects can be found in FIG. 15. The defects appear as dislocations and are formed as a large air pocket is extruded through the printer nozzle. These large scale defects will compromise the physical and mechanical performance of the container and are considered unacceptable.

Figure 16:
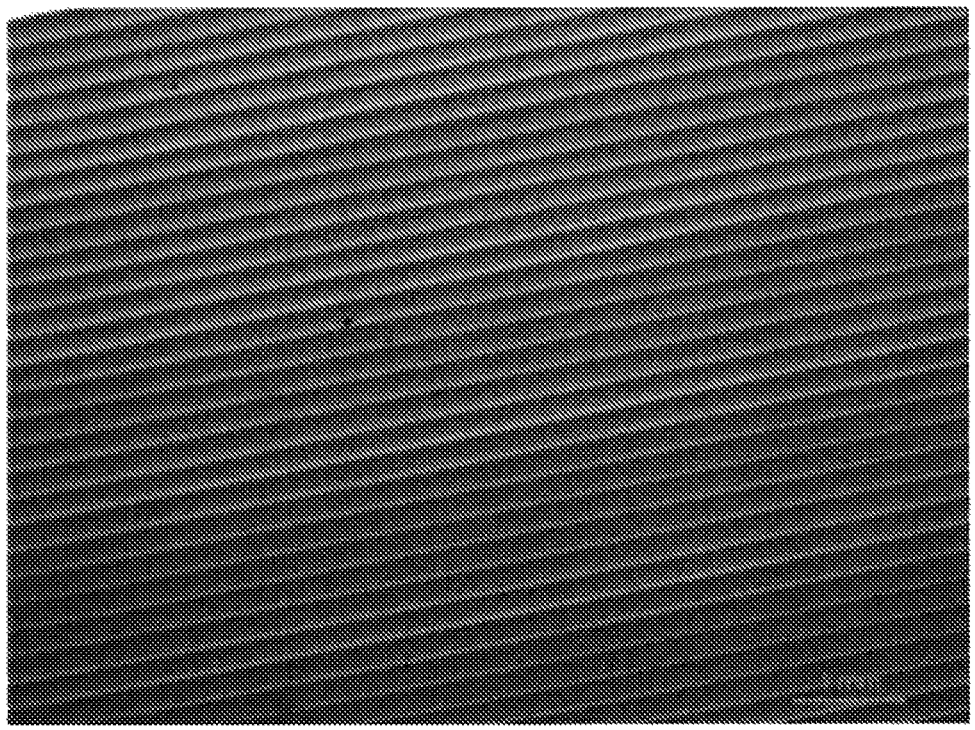
FIG. 16 shows a Container with Micro Core Filament

Magnified images of the single wall container produced using micro core filament (hollow) can be found in FIG. 16. Single wall containers were produced from these filaments were free of large scale defects.

In summary, the Micro Core filament (hollow) provided uniform flow rate and allows the air to escape out from back results in defect free 3D printing part.

What is claimed is:

1. A filament for 3D printing having an outer diameter of at least 1.75 mm, and comprising a semicrystalline or crystalline polymer, wherein the filament comprises
 a microfoam core located in the center of the filament and coated with a solid layer of polymer, wherein said microfoam comprises the semicrystalline or crystalline polymer and microvoids.

2. The filament of claim 1, wherein said filament contains a microfoam core that is less than ¾ the outer diameter of the filament.

3. The filament of claim 1, wherein said microfoam has a density reduction of less than 10 percent as compared to an unfoamed filament.

4. The filament of claim 1, wherein the microvoids have an average diameter of less than 0.5 mm.

5. The filament of claim 1, wherein the polymer is selected from the group consisting of: fluoropolymers, polyamides, polyamide 11, polyamide 12, copolyamides, block polyetheramide, polypropylene, polyethylene, semicrystalline polyether ketoneketone (PEKK), semicrystalline polyether etherketone (PEEK), polyester, and acetal.

6. The filament of claim 1, wherein said polymer comprises a fluoropolymer is a melt processable fluoropolymer selected from the group consisting of polyvinylidene fluoride (PVDF) homopolymer, PVDF copolymer, ethylene tetrafluoroethylene (ETFE), fluorinated ethylene propylene (FEP), tetrafluoroethylene/hexafluoropropylene/vinylidene fluoride copolymer (THV), PFA, ethylene chlorotrifluoroethylene (ECTFE).

7. The filament of claim 1, wherein said filament further comprises fillers.

8. The filament of claim 1, wherein said fillers are selected from the group consisting of carbon fiber, carbon powder, milled carbon fiber, carbon nanotubes, glass beads, glass fibers, nano-silica, ARAMID fiber, polyvinylidene fluoride fiber, polyarylether ketone fibers, $BaSO_4$, talc, $CaCO_3$, graphene, nano-fibers having an average fiber length of from 100 to 150 nanometers, and hollow glass or ceramic spheres.

9. The filament of claim 1, wherein the polymer comprises polyvinylidene fluoride homopolymer or copolymer.

10. A 3D article printed from the filament of claim 1.

11. A method for reducing shrink voids in a 3D printed article printed from a semicrystalline or crystalline polymer comprising the steps of:
   a) forming:
      a filament having a central core comprising a microfoam and is no more than 25% the outer diameter of the filament;
   b) feeding said filament to a 3D printer under conditions for printing an article from said filament,
wherein said filament has an outer diameter of at least 1.75 mm.

12. The method of claim 11, wherein the semicrystalline or crystalline polymer is selected from the group consisting of: fluoropolymers, polyamides, polyamide 11, polyamide 12, copolyamides, block polyetheramide, polypropylene, polyethylene, semicrystalline polyether ketoneketone (PEKK), semicrystalline polyether etherketone (PEEK), polyester, and acetal.

13. The method of claim 11, wherein said semicrystalline or crystalline polymer comprises a fluoropolymer is a melt processable fluoropolymer selected from the group consisting of polyvinylidene fluoride (PVDF) homopolymer, PVDF copolymer, ethylene tetrafluoroethylene (ETFE), fluorinated ethylene propylene (FEP), tetrafluoroethylene/hexafluoropropylene/vinylidene fluoride copolymer (THV), PFA, ethylene chlorotrifluoroethylene (ECTFE).

14. The method of claim 11, wherein said filament further comprises fillers.

15. The method of claim 14, wherein said fillers are selected from the group consisting of carbon fiber, carbon powder, milled carbon fiber, carbon nanotubes, glass beads, glass fibers, nano-silica, ARAMID fiber, polyvinylidene fluoride fiber, polyarylether ketone fibers, $BaSO_4$, talc, $CaCO_3$, graphene, nano-fibers having an average fiber length of from 100 to 150 nanometers, and hollow glass or ceramic spheres.

* * * * *